United States Patent
Jeong

(10) Patent No.: US 8,996,050 B2
(45) Date of Patent: Mar. 31, 2015

(54) SYSTEM AND METHOD FOR MEASURING OF RADIO FREQUENCY IN INTERPLANETARY SPACE

(75) Inventor: Cheol Oh Jeong, Gimpo-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 260 days.

(21) Appl. No.: 13/613,163

(22) Filed: Sep. 13, 2012

(65) Prior Publication Data

US 2013/0143484 A1 Jun. 6, 2013

(30) Foreign Application Priority Data

Dec. 5, 2011 (KR) ........................ 10-2011-0129051

(51) Int. Cl.
*H04B 7/00* (2006.01)
*H04B 7/185* (2006.01)

(52) U.S. Cl.
CPC .................................. *H04B 7/18513* (2013.01)
USPC ........... 455/509; 455/427; 455/430; 455/431; 455/67.11; 455/67.13

(58) Field of Classification Search
USPC ........... 455/509, 427, 430, 431, 67.11, 67.13, 455/63.1
See application file for complete search history.

(56) References Cited

U.S. PATENT DOCUMENTS

| 3,737,905 | A | * | 6/1973 | Haroules et al. | ............... | 342/351 |
| 6,452,538 | B1 | * | 9/2002 | Hoffman, III | ................. | 342/352 |
| 2003/0193014 | A1 | * | 10/2003 | Honma | ..................... | 250/227.14 |
| 2006/0229813 | A1 | * | 10/2006 | Tobiska | ............................ | 702/2 |
| 2014/0184463 | A1 | * | 7/2014 | Hicks et al. | .................... | 343/797 |

OTHER PUBLICATIONS

M. Tokumaru et al., Global Observations of the Solar Wind with STEL IPS Array, Asia Oceania Geosciences Society, Aug. 11, 2011, ppt. 1-19, STEL, Nagoya University.

I.V. Chashei et al. IPS Observations Using the Big Scanning Array of the Lebedev Physical Institute: Recent Results and Future Prospects, Lebedev Physical Institute, Pushchino Radio Astronomy Observatory, ppt. 1-21.

* cited by examiner

*Primary Examiner* — Fayyaz Alam
(74) *Attorney, Agent, or Firm* — William Park & Associates Patent Ltd.

(57) ABSTRACT

A system and method for observing a radio wave in an interplanetary space are provided. The system may include a tile unit to observe a Radio Frequency (RF) signal generated from a cosmic radio source in the interplanetary space, and to generate observation data, a node unit to digitalize the generated observation data, and to store the digitalized observation data, and a data analyzing unit to analyze the digitalized observation data and to compute a characteristic of a solar wind.

9 Claims, 4 Drawing Sheets

<INTERPLANETARY RADIO WAVE OBSERVATION SYSTEM 200>

SYSTEM AND METHOD FOR MEASURING OF RADIO FREQUENCY IN INTERPLANETARY SPACE

CROSS-REFERENCE TO RELATED APPLICATION

This application claims the benefit of Korean Patent Application No. 10-2011-0129051, filed on Dec. 5, 2011, in the Korean Intellectual Property Office, the disclosure of which is incorporated herein by reference.

BACKGROUND

1. Field of the Invention

The present invention relates to a system and method for observing a radio frequency, namely, a radio wave in interplanetary space, and more particularly, to an observation technology for accurately, clearly observe a speed, a density, and a direction of a solar wind in space between the sun and the earth.

2. Description of the Related Art

Due to sun explosion, the sun normally generates energy and plasma, for example corona materials, an x-ray, an ultraviolet ray, a solar radio wave, and the like. The energy generated by the sun is transferred to the earth.

When the sun explosion occurs, a cosmic radio wave may be generated, and may collide with a magnetosphere of the earth that protects the earth, by passing through space between the sun and the earth, which may cause a fluctuation of the magnetosphere and a fluctuation of an ionosphere.

The fluctuation of the magnetosphere and the fluctuation of the ionosphere may have an influence on an operation of a satellite orbiting the earth, and satellite communication between a satellite and the earth, and accordingly a communication infrastructure may be seriously damaged.

An analog-type cosmic radio wave observation technology is currently used abroad, and is being utilized to observe a cosmic radio wave in Japan, Mexico, India, and the like.

In an analog type observer, an observation time is limited, due to a weak angular resolution and a limited observation visual field.

Accordingly, there is a desire to implement an observation system that may directly measure a density, a speed and the like of a cosmic radio wave with a high resolution and a to high accuracy, by overcoming limitations of an analog cosmic radio wave observation system, such as limitations on the angular resolution, the observation visual field, and the observation time.

SUMMARY

According to an aspect of the present invention, there is provided a system for observing a solar wind in an interplanetary space between the sun and the earth, including: a tile unit to observe an interference signal of a Radio Frequency (RF) signal fluctuated due to an influence of a solar wind occurring in the interplanetary space, and to generate observation data, the RF signal being generated from a cosmic radio source existing beyond the interplanetary space; a node unit to digitalize the generated observation data, and to store the digitalized observation data; and a data analyzing unit to analyze the digitalized observation data and to compute a characteristic of the solar wind, for example a speed, a density, a direction and the like of the solar wind.

According to another aspect of the present invention, there is provided a method of observing a solar wind moving in an interplanetary space between the sun and the earth, including: observing an RF signal, amplifying observed data, and generating observation data, the RF signal being generated from a cosmic radio source and moving toward the earth, and the solar wind interfering with the RF signal in the interplanetary space; digitalizing the generated observation data, and storing the digitalized observation data; and analyzing the digitalized observation data and computing a characteristic of a cosmic radio wave, wherein the digitalizing includes performing a clock sync of received data, determining an observation time of the observation data, and synchronizing times associated with all tiles.

EFFECT

According to embodiments of the present invention, it is possible to protect a space and terrestrial radio communication broadcasting system that is expected to be damaged due to a solar wind, such as a solar magnetic storm, a Coronal Mass Ejection (CME) and the like, that are generated by sun explosion, or possible to prevent, in advance, a damage to the space and terrestrial radio communication broadcasting system.

Additionally, according to embodiments of the present invention, received data may be converted by a digitizer, and observation data may be processed in a software manner, and thus it is possible to measure the observation data with a high resolution, a high accuracy, and a high angular resolution.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
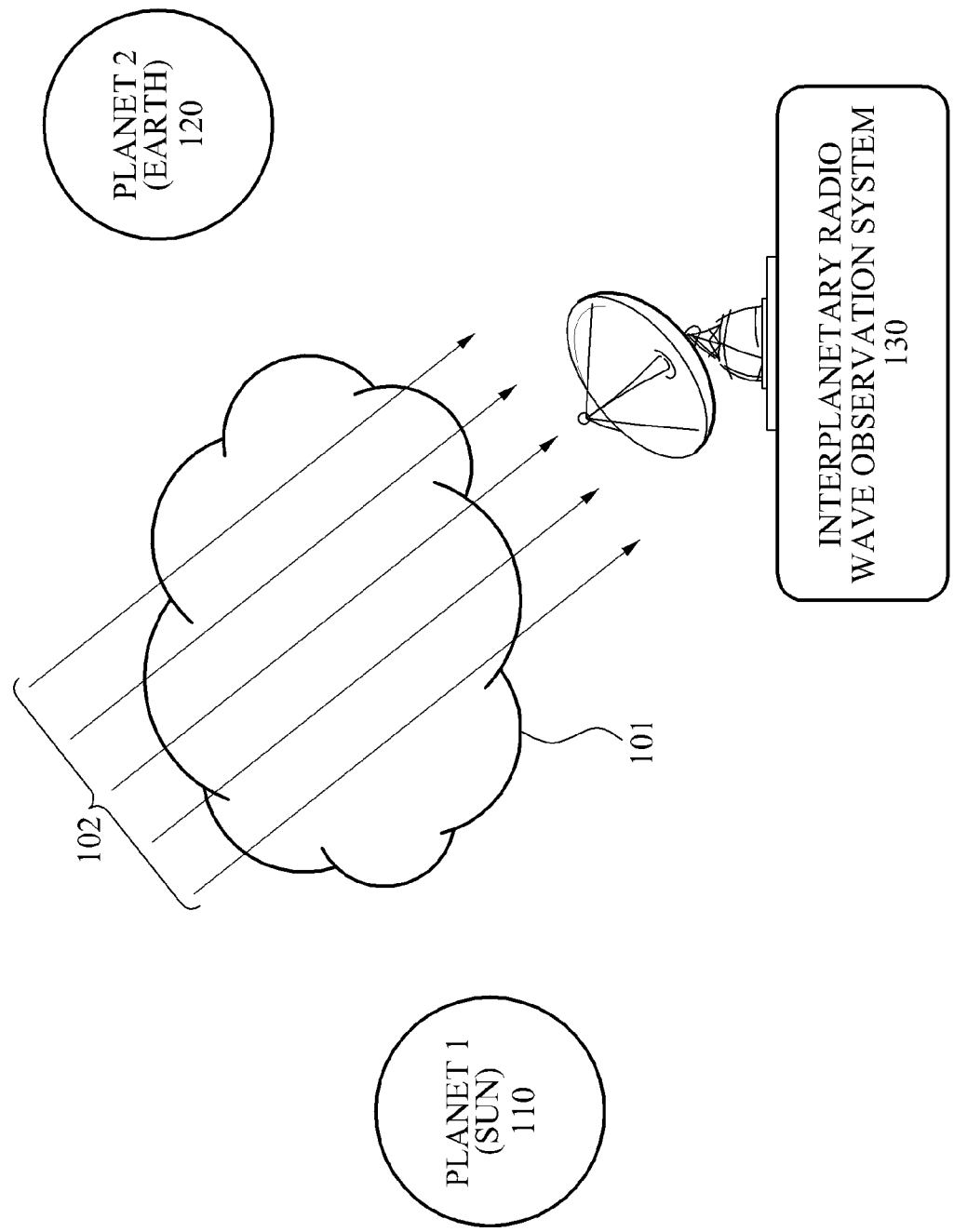
FIG. 1 is a diagram illustrating a system for observing a radio wave in an interplanetary space according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system 130 for observing a radio wave in an interplanetary space according to an embodiment of the present invention. Hereinafter, a "system for observing a radio wave in an interplanetary space" may be referred to as an "interplanetary radio wave observation system."

The interplanetary radio wave observation system 130 may observe a Radio Frequency (RF) signal, namely, a radio wave 102 of a cosmic radio source. A solar wind 101 in the form of plasma may move between a planet 1 110 and a planet 2 120, and may interfere with the RF signal.

In the present specification, the terms "RF signal" and "radio wave" may be used to have the same meaning.

Additionally, the interplanetary radio wave observation system 130 may accurately and clearly measure and analyze a speed, a density, and a direction of the solar wind 101 in the interplanetary space, using the observed radio wave.

For example, the planet 1 110 may be the sun, and the planet 2 120 may be the earth. Accordingly, when observation data observed in the interplanetary space is analyzed by a radio wave of a cosmic radio source, solar wind data may be derived.

Energy and plasma generated by sun explosion may be transferred to the earth, in the form of the solar wind 101 including plasma and Coronal Mass Ejection (CME).

The interplanetary radio wave observation system 130 may observe the radio wave 102 of the cosmic radio source, and may analyze the observed radio wave 102.

Subsequently, the interplanetary radio wave observation system 130 may analyze the speed, the density, and the direction of the solar wind 101, and may prevent a predictable damage using an analysis result. In this instance, the solar wind 101 generated by the sun explosion may interfere with the radio wave 102.

For example, the solar wind 101, such as a solar magnetic storm, a CME, and the like may be caused by the sun explosion, and may have an influence on an ionosphere and a magnetosphere of the earth, which may cause damage to a space and terrestrial broadcast communication infrastructure.

The interplanetary radio wave observation system 130 may protect a space and terrestrial radio communication broadcasting system that is expected to be damaged due to the solar wind generated by the sun explosion, or may prevent, in advance, a damage to the space and terrestrial radio communication broadcasting system.

Figure 2:
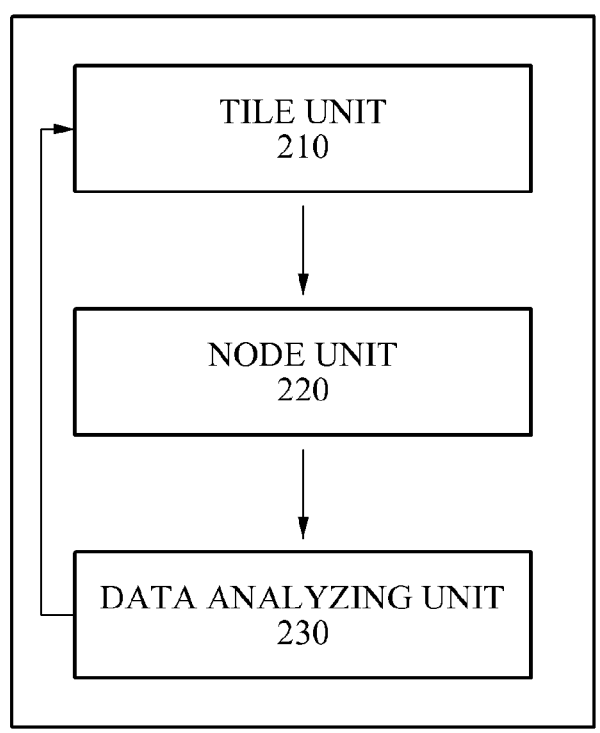
FIG. 2 is a block diagram illustrating a configuration of a system for observing a radio wave in an interplanetary space according to an embodiment of the present invention.

FIG. 2 is a block diagram illustrating a configuration of an interplanetary radio wave observation system 200 according to an embodiment of the present invention.

Referring to FIG. 2, the interplanetary radio wave observation system 200 may include a tile unit 210, a node unit 220, and a data analyzing unit 230.

The tile unit 210 may observe an RF signal, namely a radio wave of a cosmic radio source, and may generate observation data. A solar wind generated by the sun may interfere with the RF signal.

The node unit 220 may digitalize the generated observation data, and may store the digitalized observation data.

The data analyzing unit 230 may analyze the digitalized observation data, and may compute a characteristic of a cosmic radio wave.

Figure 3:
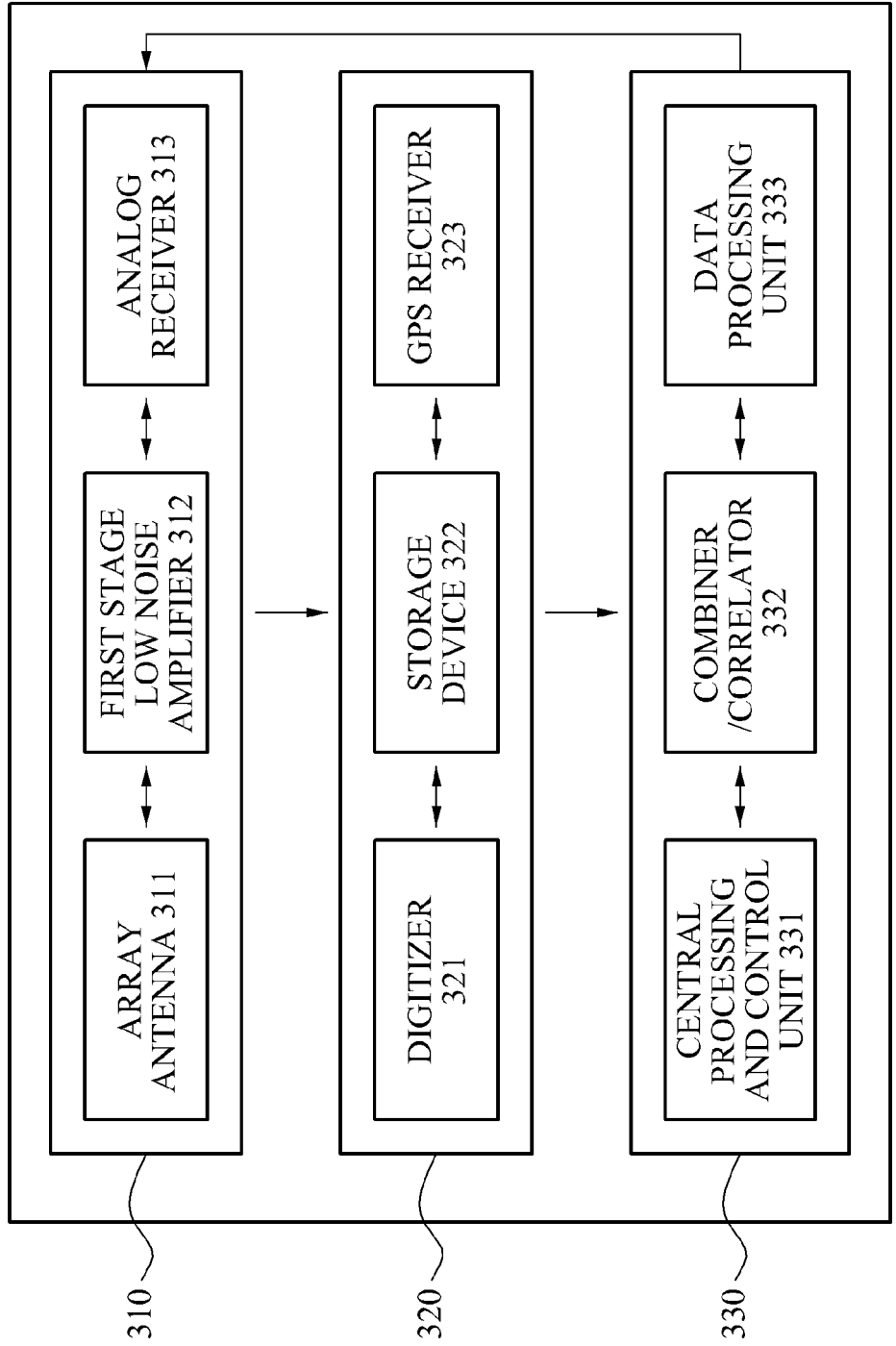
FIG. 3 is a block diagram illustrating a configuration of a system for observing a radio wave in an interplanetary space according to another embodiment of the present invention.

FIG. 3 is a block diagram illustrating a configuration of an interplanetary radio wave observation system 300 according to an embodiment of the present invention. Referring to FIG. 3, the interplanetary radio wave observation system 300 may include a tile unit 310, a node unit 320, and a data analyzing unit 330.

The tile unit 310 may observe an RF signal, namely a radio wave of a cosmic radio source, and may generate observation data. A solar wind generated by the sun may interfere with the RF signal. The tile unit 310 may include an array antenna 311, a first stage low noise amplifier 312, and an analog receiver 313.

The array antenna 311 may observe the RF signal generated in space between the sun and the earth.

The array antenna 311 may include a plurality of antenna elements that are arranged. The array antenna 311 may adjust a phase of excitation current of each of the antenna elements, may enable the antenna elements to have the same phase in a specific direction, and may form a main beam.

The first stage low noise amplifier 312 may amplify the observed RF signal.

Specifically, the first stage low noise amplifier 312 may reduce a total noise level of a receiver, with respect to a weakly observed RF signal.

For example, the first stage low noise amplifier 312 may include a parameter amplifier, a low-noise transistor amplifier, a major amplifier, and the like. Due to recent development of semiconductor technologies, the first stage low noise amplifier 312 may also include a room-temperature parametric amplifier, a Gallium Arsenide (GaAs) Field-Effect Transistor (FET), and the like.

The analog receiver 313 may collect the amplified RF signal that is an analog signal.

The node unit 320 may digitalize the generated observation data, and may store the digitalized observation data. The node unit 320 may include a digitizer 321, a storage device 322, and a Global Positioning System (GPS) receiver 323.

The digitizer 321 may digitalize observation data that is collected in the analog form and that is amplified.

Subsequently, the storage device 322 may store the digitalized observation data. The storage device 322 may include various storage media, a Central Processing Unit (CPU), and the like.

The GPS receiver 323 may synchronize at least one time associated with at least one tile.

For example, the node unit 320 may simultaneously receive observation data generated by four tile units.

In this instance, the GPS receiver 323 may synchronize observation times of the observation data that is generated by the four tile units and received by the node unit 320.

In other words, a delay may occur due to a data transmission distance, and positions in which the four tile units are installed. To prevent the delay, time synchronization may be performed using a GPS.

Accordingly, the GPS receiver 323 may synchronize observation times associated with tiles in different positions.

The GPS receiver 323 may perform clock sync of received data, may determine an observation time of the observation data, and may synchronize times associated with four tiles per node.

The data analyzing unit 330 may analyze the digitalized observation data, and may compute a characteristic of a cosmic radio wave. The data analyzing unit 330 may include a central processing and control unit 331, a combiner/correlator 332, and a data processing unit 333.

The central processing and control unit 331 may collect the digitalized observation data from the node unit 320, and may adjust antenna observation.

The combiner/correlator 332 may process a delay of data received from each node.

The data processing unit 333 may process the stored observation data.

Therefore, the interplanetary radio wave observation system 300 may protect a space and terrestrial radio communication broadcasting system that is expected to be damaged due to a solar wind, such as a solar magnetic storm, a CME and the like, that are generated by sun explosion, or may prevent, in advance, a damage to the space and terrestrial radio communication broadcasting system.

Additionally, the interplanetary radio wave observation system 300 may convert received data using a digitizer, and may process observation data in a software manner.

Thus, it is possible to ensure solar wind information with a high resolution, a high accuracy, and a high angular resolution.

Figure 4:
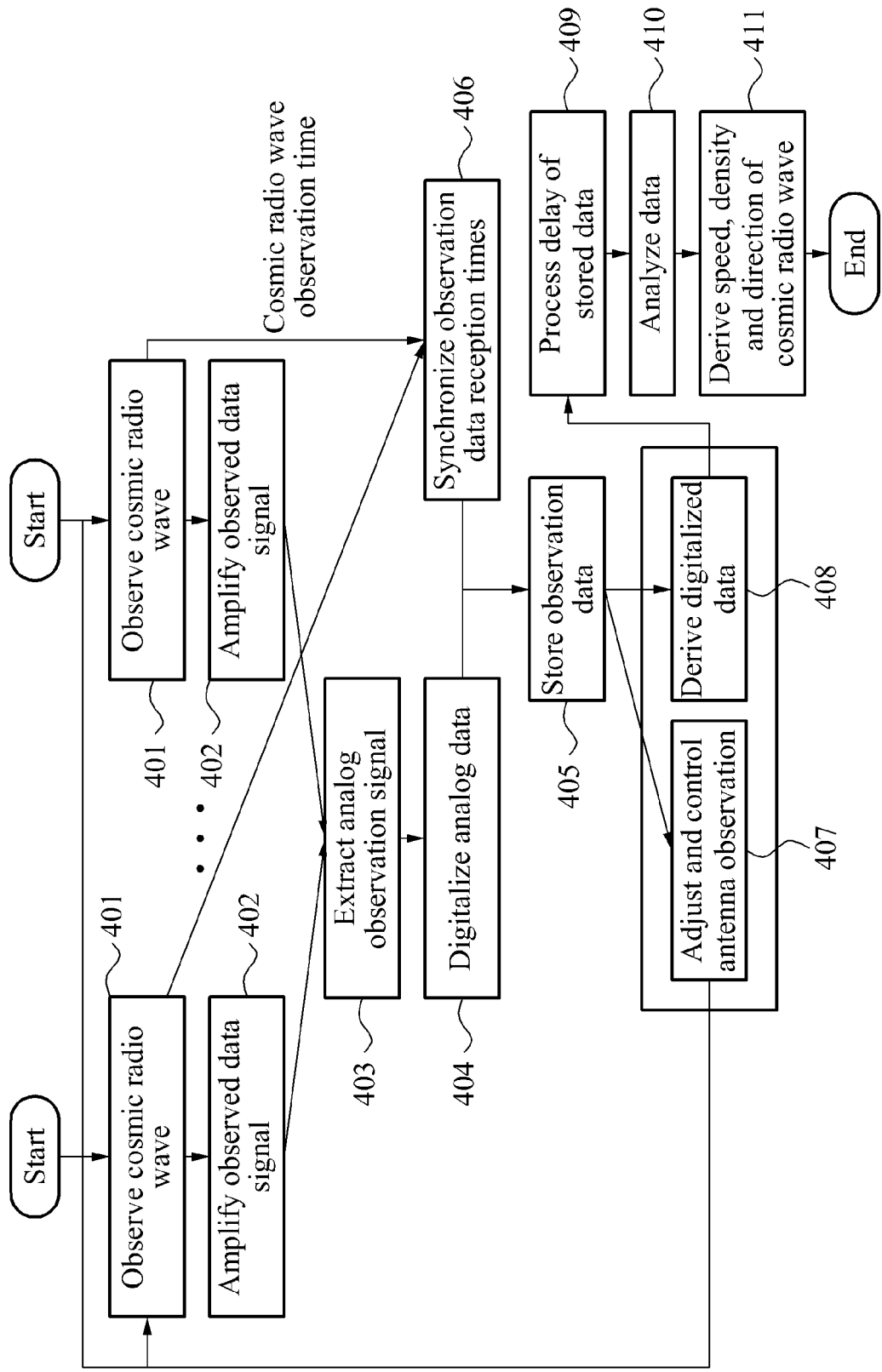
FIG. 4 is a flowchart illustrating a method of observing a radio wave in an interplanetary space according to an embodiment of the present invention.

FIG. 4 is a flowchart illustrating a method of observing a radio wave in interlunar space according to an embodiment of the present invention.

In operation 401, an RF signal, namely a radio wave of a cosmic radio source may be observed. A solar wind in the interplanetary space may interfere with the RF signal. In operation 402, an observed data signal may be amplified. In operation 403, an analog signal may be extracted, and solar wind information may be generated.

In operation 404, the observation data may be digitized. In operation 405, the digitized observation data may be stored in a storage medium.

The observation data may be measured from each of a plurality of tiles. In operation 406, observation times for each of the tiles may be synchronized using a GPS receiver.

In other words, observation data reception times for the tiles may be synchronized.

For example, clock sync of received data may be performed, observation time of the observation data may be determined, and times for all tiles may be synchronized.

To analyze data, antenna observation may be adjusted and controlled, while interoperating with the storage medium in operation 407, and digitalized data may be ensured in operation 408.

Subsequently, the digitized observation data may be analyzed, and a characteristic of the solar wind may be computed. Specifically, observation data stored in a node may be analyzed, and a speed, a density, a direction, and the like of the observed solar wind may be derived, through a data analysis center.

Specifically, a delay of the stored observation data may be processed in operation 409, and the stored observation data may be analyzed in operation 410.

Based on a result of the analyzing in operation 410, physical characteristics of the cosmic radio wave, for example a speed, a density and a direction, may be derived and analyzed in operation 411.

Therefore, by applying the method of FIG. 4, it is possible to measure the speed and the density of the cosmic radio wave with a higher resolution, a higher accuracy and a higher angular resolution, in a desired observation range.

Consequently, when the method of FIG. 4 is used, an antenna may have an extendibility enabling an installation size and position to be variable, based on an observation range with a high resolution and a high accuracy. Accordingly, an observation time and observation range may be extended, and data required for analysis may be ensured, and thus a more accurate result may be derived.

The method of observing the radio wave in the interlunar space according to the embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

As described above, according to the embodiments of the present invention, it is possible to protect a space and terrestrial radio communication broadcasting system that is expected to be damaged due to a solar wind, such as a solar magnetic storm, a CME and the like, that are generated by sun explosion, or possible to prevent, in advance, a damage to the space and terrestrial radio communication broadcasting system.

Additionally, according to the embodiments of the present invention, received data may be converted by a digitizer, and observation data may be processed in a software manner, and thus it is possible to measure the observation data with a high resolution and a high accuracy.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for observing a radio wave in an interplanetary space, the system comprising:
   a plurality of tile units, each tile unit configured to observe an interference signal of a Radio Frequency (RF) signal fluctuated due to an influence of a solar wind occurring in the interplanetary space, and to generate observation data based on the interference signal;
   a node unit configured to receive generated observation data from each one of the the tile units, the node unit including:
      a digitizer configured to digitalize the generated observation data,
      a storage device configured to store the digitalized observation data,
      a Global Positioning System (GPS) receiver configured for use in synchronizing observation data reception times of the tile units based on reception times of received observation data; and
   a data analyzing unit configured to analyze the digitalized observation data and to compute a characteristic of a cosmic radio wave.

2. The system of claim 1, further comprising:
   a central processing and control unit configured to adjust antenna observation of an antenna of a tile based on the digitalized observation data.

3. The system of claim 1, wherein the data analyzing unit comprises:
   a central processing and control unit configured to collect the digitalized observation data from the node unit, and to adjust antenna observation;
   a combiner/correlator configured to process a delay of data received from each node; and
   a data processing unit configured to process the observation data stored in the storage device.

4. A method of observing a radio wave in an interplanetary space, the method comprising:

for each one of a plurality of tiles, observing an interference signal of a Radio Frequency (RF) signal fluctuated due to an influence of a solar wind occurring in the interplanetary space, and generating observation data based on the interference signal;

digitalizing the generated observation data and storing the digitalized observation data;

synchronizing observation data reception times of the tiles based on reception times of received observation data; and analyzing the digitalized observation data and computing a characteristic of a cosmic radio wave.

5. The method of claim 4, wherein the analyzing comprises:

collecting the digitalized observation data, and adjusting antenna observation;

processing a delay of data received from each node; and processing the stored observation data.

6. The method of claim 4, wherein the synchronizing of the observation data reception times of the tiles is performed with use of a Global Positioning System (GPS) receiver.

7. The method of claim 4, further comprising:

adjusting antenna observation of an antenna of a tile based on the digitalized observation data.

8. The method of claim 5, wherein the processing of the stored observation data further comprises deriving a speed, a density, and a direction of the cosmic radio wave.

9. The system of claim 3, wherein the data processing unit is further configured to process the stored observation data by deriving a speed, a density, and a direction of the cosmic radio wave.

* * * * *